(12) United States Patent
Wiggs

(10) Patent No.: US 6,615,601 B1
(45) Date of Patent: Sep. 9, 2003

(54) SEALED WELL DIRECT EXPANSION HEATING AND COOLING SYSTEM

(76) Inventor: B. Ryland Wiggs, 425 Sims La., Franklin, TN (US) 37069

( * ) Notice: Subject to any disclaimer, the term of this patent is extended or adjusted under 35 U.S.C. 154(b) by 0 days.

(21) Appl. No.: 10/211,112

(22) Filed: Aug. 2, 2002

(51) Int. Cl.[7] .................................................. F25B 27/00
(52) U.S. Cl. ........................ 62/235.1; 62/260; 165/45
(58) Field of Search ................................ 62/235.1, 260, 62/238.6; 165/45

(56) References Cited

U.S. PATENT DOCUMENTS

| | | | | |
|---|---|---|---|---|
| 4,224,805 A | * | 9/1980 | Rothwell | 62/260 |
| 4,378,787 A | * | 4/1983 | Fleischmann | 126/589 |
| 4,544,021 A | * | 10/1985 | Barrett | 165/45 |
| 4,741,388 A | | 5/1988 | Kuroiwa | |
| 4,993,483 A | * | 2/1991 | Harris | 165/45 |
| 5,461,876 A | | 10/1995 | Dressler | |
| 5,623,986 A | | 4/1997 | Wiggs | |
| 5,738,164 A | * | 4/1998 | Hildebrand | 165/45 |
| 5,771,700 A | * | 6/1998 | Cochran | 62/117 |
| 5,816,314 A | | 10/1998 | Wiggs et al. | |
| 5,937,665 A | * | 8/1999 | Kiessel et al. | 62/260 |
| 5,937,934 A | * | 8/1999 | Hildebrand | 165/45 |
| 5,941,238 A | * | 8/1999 | Tracy | 126/641 |
| 5,946,928 A | | 9/1999 | Wiggs | |
| 6,138,744 A | * | 10/2000 | Coffee | 165/45 |
| 6,212,896 B1 | * | 4/2001 | Genung | 62/260 |
| 6,276,438 B1 | * | 8/2001 | Amerman et al. | 165/45 |
| 6,450,247 B1 | * | 9/2002 | Raff | 165/45 |

* cited by examiner

Primary Examiner—William E. Tapolcai
Assistant Examiner—Mohammad M. Ali
(74) Attorney, Agent, or Firm—Waddey & Patterson; Mark J. Patterson

(57) ABSTRACT

A sealed well direct expansion geothermal heat exchange unit, whose sealed well can be placed in ground and/or in water, consisting of a conventional direct expansion, or other heat pump, system wherein the exterior refrigerant heat exchange lines are placed within an insulated and sealed container, which container is supplied with a circulating heat conductive liquid from and to a sub-surface sealed well encasement, which container liquid may be supplemented with heat from a solar heating system, and which unit's hot refrigerant vapor line may be supplementary cooled by means of condensate water evaporative cooling.

12 Claims, 2 Drawing Sheets

SEALED WELL DIRECT EXPANSION HEATING AND COOLING SYSTEM

BACKGROUND OF THE INVENTION

The present invention relates to an improved in-ground/in-water heat exchange means for use in association with any heat pump heating/cooling system utilizing in-ground and/or in-water heat exchange elements as a primary or supplemental source of heat transfer, as well as to improved methods of installing in-ground and/or in-water heat exchange tubing.

Ground source/water source heat exchange systems typically utilize liquid-filled closed loops of tubing buried in the ground, or submerged in a body of water, so as to either absorb heat from, or to reject heat into, the naturally occurring geothermal mass and/or water surrounding the buried or submerged tubing.

Water-source heating/cooling systems typically circulate water, or water with anti-freeze, in plastic underground geothermal tubing so as to transfer heat to or from the ground, with a second heat exchange step utilizing a refrigerant to transfer heat to or from the water, and with a third heat exchange step utilizing a compressor and an electric fan to transfer heat to or from the refrigerant to heat or cool interior air space. Further, water-source heating/cooling systems typically utilize closed-loop or open-loop plastic tubing.

Closed-loop systems, often referred to as ground loop heat pumps, typically consist of a supply and return, ¾ inch to 2 inch diameter, plastic tube, joined at the extreme ends via an elbow, or similar, connection. The plastic tubing is typically of equal diameter, wall thickness, and composition, in both the supply and return lines. The water is circulated within the plastic tubing by means of a water pump. In the summer, interior space heat is collected by an a commonly understood interior compressor and air heat exchanger system, or air handler, and is rejected and transferred into the water line via a refrigerant line to water line heat exchanger. In a similar manner in the winter, heat is extracted from the water line and transferred to the interior conditioned air space via the refrigerant liquid within the refrigerant line being circulated in a reverse direction. Many such systems are designed to operate with water temperatures ranges of about a 10 degree Fahrenheit ("F.") water temperature differential between the water entering and exiting the heat exchange unit's copper refrigerant transport tubing. Water temperatures are often designed to operate in the 40 to 60 degree F. range in the summer, and in the 25 to 45 degree F. range in the winter with anti-freeze added to the water. If a closed-loop, 1.5 inch diameter, plastic water conducting tubing is installed in a horizontal fashion about 5 or 6 feet deep, in 55 degree earth, about 200 to 300 linear feet per ton of system capacity may be necessarily excavated. If the same closed-loop plastic water conducting tubing is installed in a vertical borehole in 55 degree earth, about 150 to 200 feet per ton of system capacity may be necessarily drilled. Requisite distances are longer for horizontal systems because near-surface temperature fluctuations are greater. However, trenching costs are usually less than drilling expenses. In the horizontal style installation, the plastic tubing loop is typically backfilled with earth. In the vertical style installation, the plastic tubing loop inserted into the typical 5 to 6 inch diameter borehole is generally backfilled with a thermally conductive grout. In either the horizontal or the vertical style installation, a water pump is required to circulate the water through the tubing lines, which are generally of equal diameter in both the supply and return segments.

Open-loop systems, often referred to as ground water heat pumps, typically exchange heat to and from interior conditioned air in the same manner as a closed-loop system, but the water circulation segment differs. In an open-loop system, water is pumped from a supply source, such as a well, river, or lake, is run through the water to refrigerant heat exchanger, and is then rejected back into a well, river, or lake. While open-loop systems can significantly reduce plastic tubing excavation or drilling requirements on a system capacity tonnage basis, if an adequate water supply is available, these systems pose a potential environmental threat since bacteria in the surface water transport tubing can be transferred to, and can infect, the water which is being rejected back into the public water supply.

Direct Expansion ("DX") ground source heat exchange systems typically circulate a refrigerant fluid, such as R-22, in copper underground or underwater geothermal tubing to transfer heat to or from the ground or water, and only require a secondary heat exchange step to transfer heat to or from the interior air space by means of an electric fan. In DX systems, the exterior heat exchange copper refrigerant tubing is placed directly in the geothermal soil and/or water. Historically, due to compressor operational limitations encountered with traditional DX designs installed at depths beyond 50 to 100 feet, most reverse-cycle DX systems, which operate in both the heating and the cooling modes, have been installed with an array of horizontal heat exchange tubes about 5 feet deep, or in vertical boreholes less than 100 feet deep. These prior limitations can be overcome via utilization of a supplemental refrigerant fluid pump, as disclosed in U.S. patent application Ser. No. 10/073,513, by Wiggs.

While most in-ground/in-water heat exchange designs are feasible, various improvements have been developed intended to enhance overall system operational efficiencies. Several such design improvements are taught in U.S. Pat. No. 5,623,986 to Wiggs, in U.S. Pat. No. 5,816,314 to Wiggs, et al., and in U.S. Pat. No. 5,946,928 to Wiggs, the disclosures of which are incorporated herein by reference. These designs basically teach the utilization of a spiraled fluid supply line subjected to naturally surrounding geothermal temperatures, with a fully insulated fluid return line, as well as improved subterranean heat transfer tubing and system component designs.

Other predecessor vertically oriented geothermal heat exchange designs are disclosed by U.S. Pat. No. 5,461,876 to Dressler, and by U.S. Pat. No. 4,741,388 to Kuriowa. Dressler's '876 patent teaches the utilization of an in-ground spiraled fluid supply line, but neglects to insulate the fluid return line, thereby subjecting the heat gained or lost by the circulating fluid to a "short-circuiting" effect as the return line comes in close contact with the warmest or coldest portion of the supply line. Kuriowa's preceding '388 patent is virtually identical to Dressler's subsequent claim, but better, because Kuriowa insulates a portion of the return line, via surrounding it with insulation, thereby reducing the "short-circuiting" effect. Dressler's '876 patent also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and could be functionally cost-prohibitive.

The problem encountered with insulating the heat transfer return line, by means of fully surrounding a portion of same with insulation as per Kuriowa, or by means of a fully insulated concentric tube within a tube as per Dressler, or by means of a fully insulated return line as per Wiggs' predecessor designs, is that the fully insulated portion of the return line is not exposed to naturally occurring geothermal temperatures, and is therefore a costly necessary underground/underwater system component which is not capable of being utilized for geothermal heat transfer purposes. While the utilization of such fully insulated costly components is an improvement over prior totally un-insulated geothermal heat transfer line designs subject to a "short-circuiting" of the maximum heat gain/loss potential, a design which insulates the supply line from the return line and still permits both lines to retain natural geothermal heat exchange exposure would be preferable, as disclosed in U.S. patent application Ser. No. 10/127,517 by Wiggs. Further, of course, even in horizontal and vertical closed-loop water-source heat pump systems, this "short-circuiting" effect, caused by the supply and return water transfer lines being in close proximity to one another, is a problem which deters from operational system efficiencies.

An additional problem encountered with traditional closed-loop water-source systems is the fact that, traditionally, ¾ inch to 2 inch diameter plastic water transfer tubing is utilized, so as to reduce plastic pipe costs and excavation/drilling expenses. However, as a general principle, smaller pipe sizes have greater friction efficiency losses, which result in increased requisite pumping energy.

In the early 1990s, Wiggs developed the proposition of excavating a large surface, and near-surface, area of land for the placement of a sealed container, filled with a heat conductive liquid, such as water or water and anti-freeze, and then permanently placing the exterior heat exchange tubes of a direct expansion system into the liquid-filled container. However, after a more detailed review and confidential discussion with others, it was determined that the cost, as well as the requisite surface land area requirements, involved were not likely to be advantageous over a conventional direct expansion exterior heat exchange tube installation design, so the proposition was abandoned by Wiggs. Further, such an installation would still be affected by near-surface temperature fluctuations in both the summer and the winter, and would still be subjected to "short circuiting" efficiency disadvantages encountered by a mixture of heated and cooled container liquid. The present invention, however, is superior to Wiggs' former proposition in that via the subject invention, deep sub-surface temperatures are accessed which are relatively stable year round; surface area requirements to install the system are minimal, avoiding the necessity of tearing up a yard or a pavement area; and the otherwise necessary extensive excavation and soil removal costs are replaced by a simple drilling expense. Further, and importantly, the "short circuiting" disadvantages are avoided.

Finally, while discussions have been entertained regarding the desirability of incorporating solar heating benefits into a geothermal heating system, as well as incorporating evaporative cooling benefits into a geothermal cooling system, there have been practical obstacles, such as potential extreme system operational pressure differentials, flash gas problems, system short-cycling, and energy storage issues.

Although potentially unnecessary in a sub-surface application where the sub-surface conditions include a substantial amount of natural water convection, such as in a lake, ocean, or aquifer, where the Thermally Exposed Centrally Insulated Geothermal Heat Exchange Unit disclosed by Wiggs in U.S. patent application Ser. No. 10/127,517 would be appropriate, a system design for geothermal direct expansion heat pumps, and/or for geothermal water-source heat pumps, which better avoided "short-circuiting" problems, which decreased friction efficiency losses, and which enabled solar heating and/or evaporative cooling supplements to be effectively utilized, with minimal additional costs, in subterranean soil and/or rock and/or stagnate water conditions, would be preferable. Such a preferable system would also be utilized in conditions containing a substantial amount of natural water convection where it would be useful to isolate the liquid coming into direct contact with copper refrigerant tubing from the surrounding natural water conditions, such as when the natural surrounding water conditions contain significant amounts of sulfur, acid, chlorine, or other substance potentially harmful to copper refrigerant tubing.

SUMMARY OF THE INVENTION

It is an object of the present invention to further enhance and improve the efficiency and installation cost functionality of predecessor geothermal heat exchange designs. This is accomplished by means of a sealed casement within a deep borehole, within which a fully insulated open-ended pipe is placed from the top of the casement to a point near the bottom, with the top of the pipe extended to a sealed and fully insulated liquid container within which copper, or other suitable material, refrigerant transport heat transfer tubing is placed. The copper refrigerant tubing extends, by means of a supply and a return line, to and from a compressor, an interior air handler, and related conventional heat pump equipment, without the necessity for a defrost cycle. The container is attached to the casement and to the pipe so as to permit heat conductive liquid circulation from the bottom of the casement, through the pipe, around the copper refrigerant tubes, and back down the casement, which casement is in direct thermal contact with the surrounding sub-surface earth. Circulation of the heat conductive liquid, such as water or water and anti-freeze, is effected by a liquid pump situated within the top of the pipe. A conventional solar heat collector system is connected to the container, which provides a heat sink for the solar system in the winter, and which provides supplemental heat to the primary geothermal system. The supply refrigerant vapor line runs through a condensate water collector in the summer, before the line enters the container, to provide supplemental evaporative cooling.

More specifically, a borehole is drilled to a specified depth, depending on the amount of heat transfer desired, and a casement, such as a six inch diameter steel or plastic casement, which casement has been sealed at the bottom and at all joint areas along the sides, is inserted into the full depth of the borehole. Next, a smaller diameter, such as a two and one-half inch diameter open-ended plastic pipe, which has been fully insulated, is inserted to a depth near, within about six to twelve inches, the bottom of the sealed casement. The sealed primary casement extends to a point near, or above, the surface where the open-ended plastic pipe connects to a sealed container, such as a plastic tub. The plastic tub and the primary casement are fully insulated above-ground and to a depth at least equal to the maximum frost/heat line. Heat exchange coils, such as copper refrigerant tubing, having sufficient surface area to transfer the desired amount of heat, are placed into the sealed container, with an insulated supply and return refrigerant line extending to a conventional heat pump system, comprised of a compressor, an expansion valve, an interior air handler, and other customary equipment well-known to those in the trade. The sealed container, casement, and open-ended pipe are all then filled with a heat transfer liquid, such as water and/or water and anti-freeze, and a liquid circulating pump is attached near the top of the pipe so as to pull liquid up through the open-ended pipe from the bottom of the casement deep underground. As the liquid from the bottom of the casement is pulled up through the insulated pipe, the liquid from the bottom of the casement, which is cool in the summer and warm in the winter, will circulate over the refrigerant heat transfer line, which are hot in the summer and cold in the winter, and the liquid will be pulled back to the bottom of the casement, where heat supplied to, or taken from, the liquid, through the walls of the copper refrigerant heat transfer line by the circulating refrigerant, will be transferred to the surrounding geothermal soil and/or rock and/or water by means of natural heat convection as the liquid travels to the bottom of the casement. Since the central pipe diameter is relatively large, and since the diameter of the casement is larger than the pipe, frictional efficiency losses will be minimized and efficiencies significantly increased. Further, since the pipe inside the casement is fully insulated, the common "short circuiting" heat transfer effect between the supply and return liquid lines will be substantially eliminated.

The subject invention also discloses a means of providing the warmest water from the bottom of the casement to the exiting portion of the refrigerant traveling to the compressor in the winter, as well as a means of providing the coolest water from the bottom of the casement to the exiting portion of the refrigerant traveling to the interior air handler in the summer, by means of an arrangement of piping and solenoid and/or check valves designed to switch liquid flow direction into and out of the container in a fashion commensurate with the desired refrigerant flow direction in either of the heat pump system's operational heating or cooling modes. Also, a diffuser is incorporated at the entering/exiting portion of the liquid supply/return tubes within the container so as to provide relatively even heat distribution along the refrigerant heat exchange line(s) within the container. This will enhance system efficiencies, as well as help to ensure that the warmest sensible air is provided to the interior conditioned air space in the winter, and that the coolest sensible air is provided in the summer.

As an optional efficiency enhancing supplement, solar heating may be utilized with the system in the winter. A conventional solar heating apparatus is connected in a manner so as to place the solar system's heat sink exchanger within the sealed and fully insulated liquid container. The intense heat from the solar collector will be diluted via the liquid within the container, thereby preventing operational refrigerant pressure extremes. The solar heat sink can be located at any desired point within the container, close to, or away from, the liquid supply line, so as to provide more, or less, solar heat supplement effect directly to the refrigerant fluid circulating within the refrigerant tubing as desired via preferred system operational refrigerant pressures. Any supplemental solar heat not initially absorbed by the refrigerant fluid within the refrigerant tubing will be absorbed by the liquid circulating down the casement, where the surrounding cooler earth will absorb the extra heat, and will act as a heat storage bank for a relatively continuous supplemental heat supply during the night or cloudy days. The solar heating system is enacted by a heat sensor set to engage the solar heater liquid pump when the solar heating system is able to provide heated liquid at a temperature which exceeds the temperature of the available subterranean geothermal heat.

Another type of optional efficiency enhancing solar heating supplement may be utilized with the system in the winter. In this secondary type of solar heating supplement, the solar heat collector would necessarily be located at an elevation below the solar heat sink lines within the container. This secondary type of solar heating would operate in the same manner as the first type described above, with an adjustable solar heat sink location within the container, and with any extra heat being absorbed by the liquid in the container circulating down the casement, except that the solar heating system would operate by means of refrigerant-filled supply and return refrigerant transport lines without the necessity for a liquid pump. The sun would heat the refrigerant fluid in the solar heat collector, vaporizing the refrigerant. The vapor would naturally rise into the solar heat sink tubes within the fluid within the container. The cooler liquid within the container would absorb the heat from the solar heated refrigerant. With the solar heated refrigerant vapor's heat removed by the fluid in the container, the refrigerant would condense back into a liquid, which liquid would be pulled by gravity back down into the solar heat collector, where the process would be continuously repeated until the solar collector was no longer able to supply a greater amount of heat than the sub-surface geothermal heat exchanger, at which point the solar heat collector would be disengaged by means of a heat sensor's signal to close operative solenoid valves, or the like.

A solar heat collector typically requires a minimal amount of electrical energy to operate. Since the solar system's liquid pump will require only a minimal amount of energy to circulate liquid within the pipe and casement, a conventional solar cell/storage battery system, or other renewable energy source, can be utilized to provide this total power requirement. Further, since the compressor unit's power draw for this unique system design will be so low, with a 3 ton system periodically operating on as little as 1.5 kw, the solar cell/battery storage system, or other renewable energy source system such as wind or water, could be enlarged to provide the total system energy requirement.

In the summer, a portion of the outdoors hot gas refrigerant vapor line is immersed in, or channeled through, the condensate water produced by the interior air handler in a manner so as to facilitate evaporative cooling. The condensate water can preferably be gravity fed, or can be directed to the desired location via a conventional condensate water pump, which condensate pump could also be powered by a solar cell system. This optional evaporative cooling segment will serve to take away the most extreme heat prior to the refrigerant entering the container, thereby reducing the cooling load requirements of the subterranean casement.

Except for the optional evaporative cooling segment, insulating material, such as styrofoam or rubatex, is placed around all exposed above-ground system components, and around all sub-surface exposed system components to a point at or slightly beyond the maximum frost line or significant heat line, whichever point is greater. The liquid supply pipe extending to almost the bottom of the casement is fully insulated to prevent a "short circuiting" effect with the surrounding return liquid from the container. Additionally, all other out-of-liquid refrigerant and liquid transport lines, except for the evaporative cooling segment, should be fully insulated.

When using direct expansion or other heat pump interior equipment with minimal elevation and distance differentials, an oil separator would be unnecessary, although other customary direct expansion or other refrigerant system apparatus and materials would generally be utilized, including a receiver, thermal expansion valves, an accumulator, and an air-handler, for example as described in U.S. Pat. No.

5,946,928 to Wiggs, all of which are well-known to those in the trade. If one elected to use conventional air source heat pump equipment, well known to those in the trade, in conjunction with the present invention, which invention would replace the air-source system's exterior fan/coil unit, the air-source system's defrost cycle function must be by-passed or removed.

The subject invention may be utilized as an individual unit, or by means of multiple units connected by tubing in series or in parallel, to increase operational efficiencies and/or to reduce installation costs in a number of applications, such as in, or as a supplement to, a conventional geothermal direct expansion heat pump system and/or a conventional geothermal closed-loop water-source heat pump system, or as a supplement to a conventional air-source heat pump system. The invention may be utilized to assist in efficiently heating or cooling air by means of a forced air heating/cooling system, or to assist in efficiently heating or cooling a liquid, such as water, in a hydronic heating/cooling system. Additionally, the subject invention may be utilized as a heating or cooling source in a mechanical and/or any other system.

BRIEF DESCRIPTION OF THE DRAWINGS

There are shown in the drawings embodiments of the invention as presently preferred. It should be understood, however, that the invention is not limited to the simple and precise exemplary arrangements and instrumentalities shown in the drawings, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. It is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure or system. The various features and advantages of the present invention may be more readily understood with reference to the following detailed description taken in conjunction with the accompanying drawings.

Figure 1:
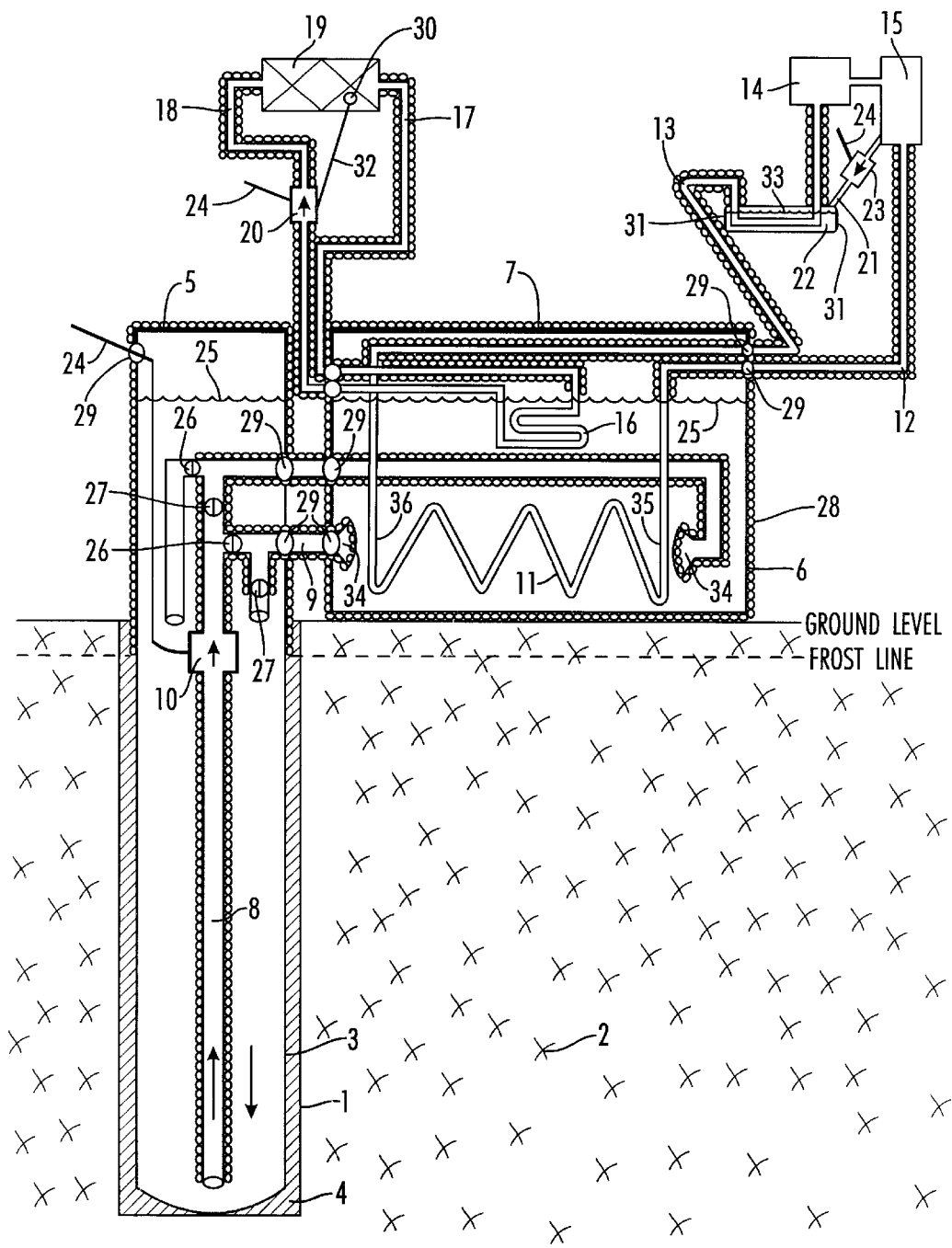
FIG. 1 is a side view of a borehole in the ground containing a mostly liquid-filled sealed casement, together with an above-ground insulated sealed liquid container. An insulated liquid supply pipe extends from near the bottom of the casement to the container, where refrigerant transport heat transfer line is located, together with a liquid return pipe. Liquid is circulated, by means of a pump, from the bottom of the casement, over the refrigerant heat transfer line in the container, and back into the top of the casement where it either absorbs or rejects heat on its way back to the bottom of the casement by means of thermal contact with the sub-surface conditions surrounding the casement. An optional supplemental solar hot liquid heating system is shown being incorporated into the system with solar heat transfer lines extended into the container. An optional supplemental evaporative cooling system is shown by means of immersing the hot gas refrigerant vapor line in a container filled by condensate water produced by the interior air handler, with refrigerant being circulated within geothermal heat pump refrigerant tubing by means of a compressor unit. An insulation material is used to completely insulate all areas of the system where thermal conductivity is not desirous, such as the above-ground portion of the casement, the entire container, the entire liquid supply pipe, and all fluid and liquid transport lines exposed to the air except for the evaporative cooling segment. The system also incorporates a piping and valve structure designed to reverse directions of the liquid supply and return pipes, to and from the container, commensurate with the reverse directional flow of refrigerant when switching from a cooling mode to a heating mode and vice versa.

Referring now to the drawings in detail, where like numerals refer to like parts or elements, there is shown in FIG. 1 a side view of a borehole 1 in the ground 2, with a fully sealed casement 3 inserted within the borehole 1, with a thermally conductive fill material 4, such as thermal grout, filling the space between the walls of the borehole 1 and the casement 3. The borehole 1 may be eight and one-half inches in diameter, and the casement 3 may be six inches in diameter, for example, with the borehole 1 and inserted casement 3 extending to an approximate depth of 50 to 500 feet, or more, depending on the amount of heat desired to be extracted from, or rejected into, the surrounding earth or ground 2.

The casement 3 is sealed at the top with a cap 5. The casement 3 is shown as being located above-ground, but can be located below-ground, or partially below-ground if desired. In other embodiments, the casement 3 can be placed in water, or water and anti-freeze, partially or fully submerged. Thus, references herein to a sub-surface placement of the casement 3 are intended to refer to positioning of some or all of casement 3 below ground or below water surface level, such that at least a portion of the casement 3 is in thermal contact with an adjacent sub-surface material.

The casement 3 has access holes 29 for a liquid, such as water or a water and antifreeze mixture, liquid supply pipe 8, which supply pipe 8 is fully insulated 28 and open-ended. The casement 3 also has access holes 29 for an open-ended liquid return pipe 9, together with an access hole 29 for an electrical power cord 24 to power the liquid pump 10. The liquid pump 10 shown is a submersible liquid pump 10 located below the liquid line level 25 in the casement 3 so as to be self-priming. However, since the liquid pump 10 is located near the top portion of the casement 3, virtually any form of conventional liquid pump 10 could be utilized. The liquid supply pipe 8, and the relatively short liquid return pipe 9, may consist of a two and one-half inch diameter PVC pipe, for example, with the entire liquid supply pipe 8 completely surrounded by one-half to one-inch thick insulation 28 material. The relatively large diameter liquid supply pipe 8, together with the extra-large diameter, six inches for example, of the casement 3, through which casement 3 the liquid returns to the bottom, greatly reduces liquid head pressures caused by smaller diameter wall friction, as exists in most conventional designs.

Adjacent to the casement 3, a container 6 is located. The container 6 is comprised of a liquidtight vessel, such as a large plastic tub, with an access container lid 7 at the top. The container 6 has access holes 29 for supply and return liquid pipes 8 and 9, for refrigerant supply (liquid) and return (vapor) lines 12 and 13, and for solar liquid supply and return lines 17 and 18.

The refrigerant liquid line 12 and a refrigerant vapor line 13, are shown entering/exiting the casement 3 through access holes 29, and being connected to respective first and second end portions 35 and 36 of a refrigerant heat exchange line 11 below the liquid level line 25 in the container 6. The refrigerant liquid line 12 may consist of, for example, a ½ inch diameter copper line, and the refrigerant vapor line 13 may consist of a ⅞ inch diameter copper line, for example. The refrigerant heat exchange line 11 below the water line 25 in the container 6, which is connected to the refrigerant liquid line 12 and vapor line 13, may consist of one or more tubes, such as copper tubing, which will adequately effect heat transfer in liquid, such as one or more extended 1 inch, or ⅞ inch, or ½ inch, or ¼ inch, or ⅛ inch, finned or unfinned, tubes, or the like. Liquid is circulated over the refrigerant heat exchange line 11 within the container 6 by means of a liquid pump 10 situated below the liquid level line 25 connected to the supply pipe 8 within the casement 3. An electric power cord 24 extends from the liquid pump 10 through an access hole 29 in the casement 3 to a power source, such as a conventional wall outlet (not shown), or to some other electrical power source, such as a natural/renewable wind, solar, or water, energy power source, or the like. The heat conductive liquid is distributed to the refrigerant heat exchange line 11 by some form of diffuser 34, such as a trumpet style, with a series of uniformly spaced holes in the end, diffuser 34, as shown, or the like, so as to distribute the liquid, supplied from near the bottom of the casement 3, over the refrigerant heat exchange line 11 in a relatively even manner.

The liquid supply pipe 8 and the liquid return pipe 9 are shown as respectively connecting below the liquid level line 25 in both the casement 3 and the container 6, so as to avoid any air pockets or liquid pump 10 priming issues. However, the liquid supply and return pipes, 8 and 9, could easily be constructed to enter and exit the casement 3 and the container 6 from the top (not shown), and filled/primed with liquid, if desirable so as to avoid having to liquid-tight seal access holes 29 in the sides of the casement 3 and the container 6.

The system is shown as operating in the cooling mode. Consequently, the coolest liquid from the bottom of the casement 3 is shown as flowing through the liquid supply pipe 8 into the container 6, directly in front of a first end portion 35 of the submerged heat exchange line 11 which is transporting cooled refrigerant through refrigerant liquid line to an interior air handler unit 15, where the cooled refrigerant absorbs and removes heat from the interior air via flowing through conventional finned copper tubing (not shown since well understood by those skilled in the trade). The liquid flowing along the heat exchange line 11, within the container 6, absorbs heat from the hot refrigerant fluid being circulated by the compressor unit 14 inside the heat exchange line 11. The heated fluid exits into the top of the casement 3 by means of the liquid return pipe 9. As the heated liquid is pulled along the side walls of the casement 3, in direct proximity to the fill material 4 and ground 2, the heat is absorbed and removed by naturally occurring thermal contact with cooler geothermal ground temperatures. The liquid is pulled down along the side walls of the casement 3, by means of the liquid flow necessitated by the liquid pump 10 pulling cooled liquid up from the bottom of the casement 6 through the supply pipe 8.

In a reverse-cycle heating/cooling system, a series of solenoid valves and/or check valves in the compressor unit 14, which are well known to those skilled in the trade and are not shown herein, operate to reverse the direction of the refrigerant flow, except through the actual compressor (not shown), when switching from a cooling mode to a heating mode and vice versa. It would be preferable for the liquid supply pipe 8 to be constructed in a manner so as to always, in a cooling mode, discharge the supply liquid acquired from the bottom of the casement 3, which will generally be the coolest liquid in the summer, proximate the first end portion 35 of the refrigerant copper heat exchange line 11, and, in a heating mode, to discharge the supply liquid acquired from the bottom of the casement 3, which will generally be the warmest liquid in the winter, not taking into account the optional solar supplement in the winter daytime, proximate second end portion 36 of the refrigerant heat exchange line 11 in both a single-cycle and a reverse-cycle heating/cooling system. To accomplish this objective in a reverse-cycle system, the liquid flow through the supply pipe 8 and the return pipe 9, located within the container 6, should be reversed as the refrigerant flow reverses direction within the heat exchange line 11 when switching from a cooling mode to a heating mode and vice versa. This will provide maximum system heating and cooling efficiencies as the warmed refrigerant travels to the compressor unit 14 in the winter, and as the cooled refrigerant travels to the interior air handler unit 15 in the summer. To accomplish this reverse direction liquid flow into and out of the container 6, a simple arrangement of piping and of check valves and of solenoid valves could be utilized near the liquid pump 10, which will always be pumping liquid up from the bottom of the casement 3 in the same direction, as readily understood by those skilled in the art.

As one example of a piping arrangement enabling a reversible liquid flow direction within the container 6, to correspond with the directional flow of the refrigerant within the heat exchange line 11 as the refrigerant flow direction reverses when changing from a cooling mode to a heating mode, supply and return pipes, 8 and 9, are shown as being located above the liquid pump 10, extending out of and into the casement 3 and extending back into and out of the container 6. In the cooling mode, two "A" closed solenoid valves 26 are respectively installed on the supply and return pipes, 8 and 9, above the liquid pump 10 as shown, with the two "B" open solenoid valves 27 respectively installed on the supply and return pipes, 8 and 9, above the liquid pump 10 as shown. Liquid will be pulled up from the bottom of the casement 3 by the liquid pump 10, which will always operatively pump liquid in the same direction up from the bottom of the casement regardless of the direction of the supply and return liquid to and from the container 6. When operating in the heating mode, the two "A" solenoid valves 26 are respectively opened (not shown), and the two "B" solenoid valves 27 are respectively closed (not shown), thereby reversing the directional flow of the liquid within the container so as to maximize the heating effect to the returning portion of the heat exchange line 11. The "A" and "B" solenoid valves, 26 and 27, are connected to a control unit (not shown) by solenoid valve wires (not shown), as readily understood by those skilled in the art, so as to respectively open and close the "A" and "B" solenoid valves, 26 and 27, when switching from a cooling mode to a heating mode, and vice versa. When the supply and return pipes, 8 and 9, are installed in a reverse operational mode, as described above, all such pipes, 8 and 9, should be fully covered with insulation material 28, such as rubatex, or the like.

An optional supplemental solar heating method is shown as being incorporated into the system. A conventional solar heat collector 19 is placed on a roof (not shown), or in another convenient location, exposed to the sun (not shown). A solar heat liquid transfer supply line 17 and return line 18 will transfer a liquid, such as water and anti-freeze, from and to the solar heat collector 19 and to and from the solar heat sink lines 16 situated below liquid level 25 in the container 6. The solar heating system liquid is circulated by means of a solar system liquid pump 20, receiving power from an electrical power cord 24 connected to either a conventional power source or to some other natural/renewable energy electrical power source. The solar heat liquid transfer supply line 17 and return line 18 are shown as being covered with insulation material 28 so as to preserve any extra heat gained from the solar heat collector 19 entirely for the heat conductive liquid below the liquid level line 25 in the casement 3. While the solar heat sink lines 16 are shown as located below the liquid level 25 in the center of the container 6, the solar heat sink lines 16 can be moved to a location either closer to, or farther from, the exiting portion of the copper heat exchange line 11, which is carrying refrigerant to the refrigerant vapor line 13 in the winter, depending on the system operational refrigerant pressures desired. The solar heating method would be engaged by a temperature sensor 30 connected to the solar heating system's liquid pump 20 by means of a wire 32 of sufficient capacity to transmit on/off signals. The on signal would be transmitted only when the solar heating unit can provide heated liquid in excess of some pre-determined temperature, greater than the sub-surface geothermal temperature, such as a temperature in excess of 60 degrees F. in many locations. When the solar heating method is unable to provide heated liquid at the minimum predetermined temperature, the off signal would be transmitted by the sensor 30 to the solar system's liquid pump 20, so as not to take heating capacity away from the primary natural geothermal heat source in the ground 2 or sub-surface.

While operating in the cooling mode, the system is shown with a condensate water pump 23 transferring water from an interior heat exchanger, such as interior air handler 15, through a water condensate drain line 21 into a half-pipe 22, located outdoors, through which an un-insulated portion of the refrigerant vapor line 13 runs on its way from the air handler 15 to the container 6. The half-pipe 22 has sealed ends 31 so as to contain the condensate water. The condensate water, being in direct proximity with, and typically covering, the hot refrigerant vapor line 13 in the half-pipe 22, will absorb heat from the hot refrigerant within the vapor line 13 and will evaporate into the exterior air, thereby removing heat from the refrigerant and lessening the heat removal load on the rest of the geothermal system. The evaporative cooling system shown, as with other disclosed elements of this subject invention, is not intended in a limiting fashion, as other analogous evaporative cooling means may be utilized via utilization of condensate water so as to lessen the load on the rest of the geothermal system. Although not shown in the drawings, in the winter, the exposed portion of the hot gas refrigerant vapor line 13, located within the half-pipe 22, would be fully covered with an insulation material 28, such as rubatex, or the like. Condensate water from a de-humidifier (not shown), or other means for accomplishing interior heat exchange, could also be utilized in a similar manner to remove heat from the hot gas vapor refrigerant line 13, for evaporative cooling purposes, prior to the hot refrigerant entering the container 6 and being cooled by primary geothermal means as described herein. A conventional de-superheater (not shown) may also be incorporated into the system. A de-superheater typically circulates water from the interior hot water tank around the hot refrigerant vapor line so as to transfer heat from the refrigerant to the interior hot water supply, typically significantly reducing hot water heating expenses. Utilization of a de-superheater in the cooling mode would also serve to lessen the heat removal load on the rest of the geothermal system.

Instead of heating and cooling air, the subject invention could alternatively be utilized to heat and cool a liquid, such as water, in a hydronic heating/cooling system, or could be utilized for hot water generation purposes only. In such a hydronic/hot water application only, the conventional air handler unit 15 would be replaced with a conventional water heat exchange unit (not shown) similar to a de-superheater, as would readily be understood by those skilled in the art.

Insulation materials 28, which are to be utilized to surround all portions of the subject system where thermal conductivity is not desirous, are well known and include, but are not limited to, insulation materials 28 such as fiberglass, styrofoam, rubatex, and the like, all of which are well known to those in the trade. The entire liquid supply pipe 8, and the entire container 6 should be fully covered with insulation material 28, as should all system liquid and fluid transport pipes and lines, 8, 9, 12, 13, 17, and 18, exposed to the air, excepting the evaporative cooling segment of the hot gas refrigerant vapor line 13 within the half-pipe 22 in the summer.

Figure 2:
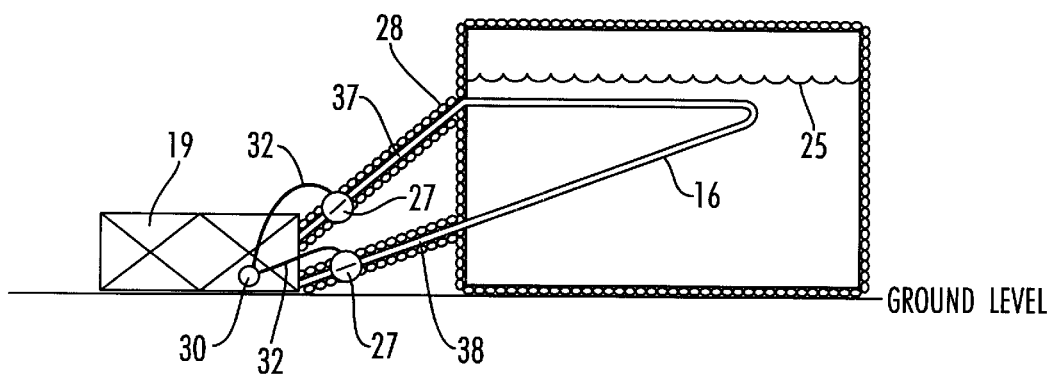
FIG. 2 is a side view of a refrigerant fluid operative solar heating system which supplies heat to liquid in the mostly liquid-filled container of FIG. 1, without showing the other system components of FIG. 1.

FIG. 2 shows a secondary optional supplemental solar heating method as being incorporated into the system. A conventional solar heat collector 19 is placed on the ground below the liquid level 25 in the container 6, or at another convenient location below that of the liquid level 25 in the container 6, with the solar heat collector 19 exposed to the sun (not shown). A solar heat fluid transfer supply line 37 and return line 38 will transfer a fluid, such as a refrigerant fluid, from and to the solar heat collector 19 and to and from the solar heat sink lines 16 situated below liquid level 25 in the container 6. The liquid is circulated by means of naturally occurring refrigerant properties, whereby refrigerant heated by the sun evaporates (vaporizes) and naturally rises into the solar heat sink lines 16. Since the solar heat sink lines 16 are located below the colder liquid level 25 in the container 6, the refrigerant will condense into a liquid, which gravity will pull back down into the solar heat collector 19, where the process will be continuously repeated as long as the sun provides adequate heat. The solar heating system's phase change is effected by a correct refrigerant charge and pressure, as is understood by those skilled in the art. The solar heat refrigerant vapor transfer supply line 37 and refrigerant liquid return line 38 are shown as being covered with insulation material 28 so as to preserve any extra heat gained from the solar heat collector 19 entirely for the heat conductive liquid below the liquid level line 25 in the casement 3. While the solar heat sink lines 16 are shown as located below the liquid level 25 in the center of the container 6, the solar heat sink lines 16 can be moved to any location within the container 6, depending on the primary system's operational pressures desired, as explained in the detailed description of FIG. 1 hereinabove. The solar heating method would be engaged by at least one open solenoid valve 27, although two such open solenoid valves 27 are shown, so as to avoid having to insulate the solar heat collector 19 when it is inoperative. The on signal would be transmitted to open the solenoid valves 27, by means of sensor wires 32 connected to a solar temperature sensor 30, only when the solar heating unit can provide heated liquid in excess of some pre-determined temperature, greater than the sub-surface geothermal temperature, such as a temperature in excess of 60 degrees F. in many locations. When the solar heating method is unable to provide heated liquid at the minimum pre-determined temperature, the off signal would be transmitted by the sensor 30 to the solar system's solenoid valves 27, so as to close them (not shown), so as not to take heating capacity away from the primary natural geothermal heat source in the ground 2 or sub-surface.

Although particular embodiments of a system and method to enhance the operational efficiencies and installation cost functionality of geothermal heat exchange installations are described, it is not intended that such description be construed as limiting the scope of this invention, except as set forth in the following claims:

What is claimed is:

1. A geothermal heat exchange system comprising:
   a refrigerant liquid line and a refrigerant vapor line;
   a refrigerant heat exchange line having a first end portion connected to the refrigerant liquid line and a second end portion connected to the refrigerant vapor line;
   a liquid container containing a heat conductive liquid up to a liquid level, the refrigerant heat exchange line positioned within the container below the liquid level and in thermal contact with the heat conductive liquid;
   the refrigerant liquid line, the refrigerant vapor line, and the refrigerant heat exchange line adapted to circulate refrigerant into and out of the liquid container;
   a liquid casement having a top portion, a bottom portion, and an inner diameter, at least the bottom portion of the casement in thermal contact with sub-surface material proximate the casement;
   a liquid supply pipe extending from the bottom portion of the casement, out of the casement, and into the liquid container, the liquid supply pipe having an outer diameter that is smaller than the inner diameter of the casement;
   a liquid return pipe extending from the liquid container to the top portion of the casement; and
   a liquid pump operatively connected to the liquid supply pipe and to the liquid return pipe, the liquid pump, the liquid supply pipe, and the liquid return pipe operative to circulate the heat conductive liquid from the bottom portion of the casement, into the liquid container, around the refrigerant heat exchange line, out of the liquid container, and to the top portion of the casement.

2. The system of claim 1 wherein:
   the system is operative in a cooling mode;
   the liquid return pipe is positioned within the container so that when the system is operating in the cooling mode, the liquid return pipe receives the heat conductive liquid proximate the second end portion of the refrigerant heat exchange line; and
   the liquid supply pipe is positioned within the container so that when the system is operating in the cooling mode, the liquid supply pipe discharges the heat conductive liquid proximate the first end portion of the refrigerant heat exchange line.

3. The system of either of claim 1 or claim 2 wherein:
   the system is operative in a heating mode; the liquid return pipe is positioned within the container so that when the system is operating in the heating mode, the liquid return pipe receives the heat conductive liquid proximate the first end portion of the refrigerant heat exchange line; and
   the liquid supply pipe is positioned within the container so that when the system is operating in the heating mode, the liquid supply pipe discharges the heat conductive liquid proximate the second end portion of the refrigerant exchange line.

4. The system of claim 3 further comprising valve means connected to the liquid return and supply pipes, the valve means operative to reverse direction of circulation of the heat conductive liquid into and out of the liquid container when the system is switched between the cooling and heating modes.

5. The system of claim 1 further comprising a solar liquid heating system connected to the liquid container and operative to supply heat to the heat conductive liquid in the container when the heat supplied by the solar liquid heating system has a temperature that exceeds the temperature of the heat conductive liquid in the container.

6. The system of claim 5 wherein the solar liquid heating system comprises:
   a solar heat collector, solar heat refrigerant, a solar heat refrigerant supply line and a solar heat refrigerant return line;
   solar heat sink lines positioned in the liquid container below the liquid level and in thermal contact with the heat conductive liquid; and
   the solar heat refrigerant supply and return lines connecting the solar heat collector to the solar heat sink lines in the liquid container and operative to provide circulation of the solar heat refrigerant between the solar heat collector and through the solar heat sink lines in the liquid container.

7. The system of claim 6 wherein the solar heat collector is positioned to be below the liquid level in the container so that the circulation of the solar heat refrigerant occurs as a consequence of evaporation of the solar heat refrigerant within the solar collector and solar heat refrigerant supply line and condensation of the solar heat refrigerant in the solar heat sink lines and the solar heat return line.

8. The system of claim 6 wherein the position of the solar heat sink lines within the container can be adjusted to modify the amount of solar heat directly supplied to the refrigerant heat exchange line.

9. The system of claim 1 further comprising:
   a compressor operatively connected to the refrigerant vapor line; and
   an interior heat exchange means operatively connected to the refrigerant liquid line and to the compressor.

10. The system of claim 9 further comprising means to supply condensate water generated by operation of the interior heat exchange means so as to be in thermal contact with the refrigerant vapor line to promote evaporative cooling of the refrigerant vapor line.

11. The system of claim 1 further comprising thermal insulation applied to the liquid supply pipe, to the liquid return pipe, and to the liquid container.

12. The system of claim 1 further comprising a first liquid diffuser attached to the liquid supply pipe in the liquid container and a second liquid diffuser attached to the liquid return pipe in the liquid container.

* * * * *